(12) United States Patent  
Doherty et al.

(10) Patent No.: US 7,143,078 B2  
(45) Date of Patent: Nov. 28, 2006

(54) SYSTEM AND METHOD FOR MANAGED DATABASE QUERY PRE-OPTIMIZATION

(75) Inventors: L. Roger Doherty, Philadelphia, PA (US); Charles R. Reeves, Jr., Snohomish, WA (US); Eric Guthmann, Omaha, NE (US)

(73) Assignee: Microsoft Corporation, Redmond, WA (US)

( * ) Notice: Subject to any disclaimer, the term of this patent is extended or adjusted under 35 U.S.C. 154(b) by 455 days.

(21) Appl. No.: 10/608,853

(22) Filed: Jun. 27, 2003

(65) Prior Publication Data

US 2004/0267719 A1 Dec. 30, 2004

(51) Int. Cl.
G06F 7/00 (2006.01)
(52) U.S. Cl. .................. 707/1; 707/1; 707/2; 707/3
(58) Field of Classification Search ............. 707/1–3
See application file for complete search history.

(56) References Cited

U.S. PATENT DOCUMENTS 6,151,602 A * 11/2000 Hejlsberg et al. ............. 707/10
6,314,430 B1 * 11/2001 Chang ..................... 707/103 R
6,820,082 B1 * 11/2004 Cook et al. ..................... 707/9
6,950,848 B1 * 9/2005 Yousefi'zadeh .............. 709/203
6,961,725 B1 * 11/2005 Yuan et al. ..................... 707/4
2003/0187841 A1 * 10/2003 Zhang et al. .................. 707/4
2004/0064554 A1 * 4/2004 Kuno et al. ................. 709/225

* cited by examiner

*Primary Examiner*—Thomas Lee  
*Assistant Examiner*—Sean Weinman  
(74) *Attorney, Agent, or Firm*—Microsoft Corporation (57) ABSTRACT

A system and method that manages and pre-optimizes incoming database queries by decomposing queries into component parts, and executing corresponding pre-compiled procedures. A requestor specifies search arguments and/or query options. Middle tier code cooperates with database code by decomposing the query operations into stages, one stage for each specified search argument. To improve performance, the stages are ordered such that the most selective searches are executed first, and if after any stage it is recognized that no results are possible, the search terminates without attempting further stages. As each stage is executed, a list of matching keys is maintained in the database. After completing the stages, the list is sorted as specified and returned to the middle tier, which then retrieves the details for each entity represented in the key list, and formats and returns the results to the client. Relatively complex queries may be submitted without executing ad-hoc queries.

25 Claims, 5 Drawing Sheets

SYSTEM AND METHOD FOR MANAGED DATABASE QUERY PRE-OPTIMIZATION

FIELD OF THE INVENTION

The invention relates generally to computer systems and networks, and more particularly to database queries.

BACKGROUND OF THE INVENTION

There are many types of computing services, resources and data that computer users and applications need to manage and otherwise access, such as services and data maintained on corporate networks and other remotely accessible sites including intranets and the internet. As there are many different computing platforms, various platform-independent mechanisms and protocols that facilitate the exchange of network information are becoming commonplace, including HTTP (HyperText Transfer Protocol), XML (eXtensible Markup Language), XML Schema, and SOAP (Simple Object Access Protocol). The concept of web services, in which businesses, organizations, and other providers offer services to users and applications, is based on these standards. Web services are services that connect applications across an intranet, extranet, or across the Internet, so that these applications can share resources and information. Web services can be offered by any individual or organization that has the tools to create them and make them available to other individuals or organizations online.

To be of value, web services need to enable users and applications to locate them, and exchange the information needed to execute them. To this end, UDDI (Universal Description Discovery & Integration) provides a set of defined services (e.g., in a universal business registry) that help users and applications discover such businesses, organizations, and other web services providers, along with a description of their available web services and the technical interfaces needed to access those services. UDDI thus facilitates the connection between the providers and the consumers of Web services. Although such services may be provided over the internet, services also may be provided in an enterprise environment or other intranet, where the services and their usage may be more controlled. Thus, not just UDDI, but other service registries (such as one based on Microsoft Corporation's Active Directory®) may provide a way of locating a distributed service.

However, the development of database-centric web services such as UDDI requires the ability to simultaneously handle (up to) thousands of queries against a database, at a time when the database also may be being subjected to substantially intensive update operations. Many database management systems cannot adequately meet such demands, particularly when having to deal with complex queries.

One way to handle such a large volume of queries is to force users to use a limited set of enumerated queries. However, limiting the users in this way is simply not sufficiently flexible with respect to the types of queries users often need to submit for web service-related requests, and other types of requests. Users need flexibility, but handling large amounts of ad hoc queries that are often complex is too inefficient to handle at times in a heavy, mixed-use (i.e., read-write) database environment, and also presents some security issues that do not exist with enumerated queries.

SUMMARY OF THE INVENTION

Briefly, the present invention provides a system and method that manages and pre-optimizes incoming queries by decomposing those queries into smaller component parts based on search arguments, and then mapping those component parts into pre-compiled, stored procedures that are used to search the database for matching keys. To this end, the method and system intelligently decomposes database queries into manageable, pre-compiled procedures that make efficient use of the database's native query processing capabilities, execute the pre-compiled procedures in stages to obtain matching keys, and then use those keys to obtain the query results. By pre-processing in this way, some of the workload is performed external to the database/database management system, improving efficiency. At the same time, flexibility is provided in that relatively complex queries may still be submitted because they are broken down into smaller more manageable parts, while security is maintained by only executing pre-compiled procedures rather than ad-hoc queries.

The managed query pre-optimization of the present invention encapsulates the runtime execution of query operations that provide a flexible yet well-defined inquiry interface (e.g., formatted in an XML message) for a web service or other data-centric application. Rather than exposing the underlying database schema to potentially inefficient and often complex ad-hoc queries, inquiries are managed by exposing an interface that allows the requestor to specify a variety of different search arguments and query options which are pre-optimized to ensure efficient execution while retaining the benefits of a limited ad-hoc query interface.

To this end, using a cooperative process between middle tier code and database stored procedure code, complex inquiry operations are broken down into stages. There is one stage for each search argument specified in the original inquiry. As each stage is executed, a list of matching keys is maintained in the database. This list of keys expands or contracts as each stage of the query is executed, and as influenced by various query options such as filtering exposed in the inquiry interface. After the stages have been executed, the inquiry option is completed and the list of matching keys is sorted according to any query sort options also exposed in the inquiry interface, and is returned to the middle tier. The middle tier then retrieves the full details for each entity represented in the key list, formats the results and returns the results to the client.

In one implementation, a client application program sends a message seeking information that is maintained in a database, and the message is received at a middle tier. The message is deserialized and validated, and if valid, decomposed by a managed query pre-optimizer into pre-compiled stored procedure primitives which search the database for keys. Before searching to find the keys corresponding to a search argument, the search argument's corresponding primitives are ordered into a most-selective-first ordering to optimize the results by attempting to obtain the least number of hits first. The middle tier then orchestrates the execution of the stored procedure primitives while it processes the search.

To process the primitives, a set manager manages at least one staging area to perform logical AND operations on results for searches, with each search based on stored procedure primitives corresponding to search arguments. A second staging area may be used for logical OR operations on partial results within a search argument when an OR operation is specified. Whenever each search argument is processed by the database components, the number of matching keys is returned. In an environment in which search arguments are AND-ed together, if there are no matches for that argument, the search terminates with no matches found, because anything that is AND-ed with that (empty) result set thereafter will not provide results.

When the primitives have been processed and at least one key matches, the search is committed by a commit mechanism in the middle tier, along with commit logic in the database server in which the list of matching keys is sorted (if specified) according to query options exposed in the inquiry interface. Once sorted, a result retrieval mechanism in the middle tier in conjunction with primitive get logic retrieves the full details for each entity level represented in the key list. The middle tier formats, serializes and returns the results to the client.

Other advantages will become apparent from the following detailed description when taken in conjunction with the drawings, in which:

DETAILED DESCRIPTION

Exemplary Operating Environment

Figure 1:
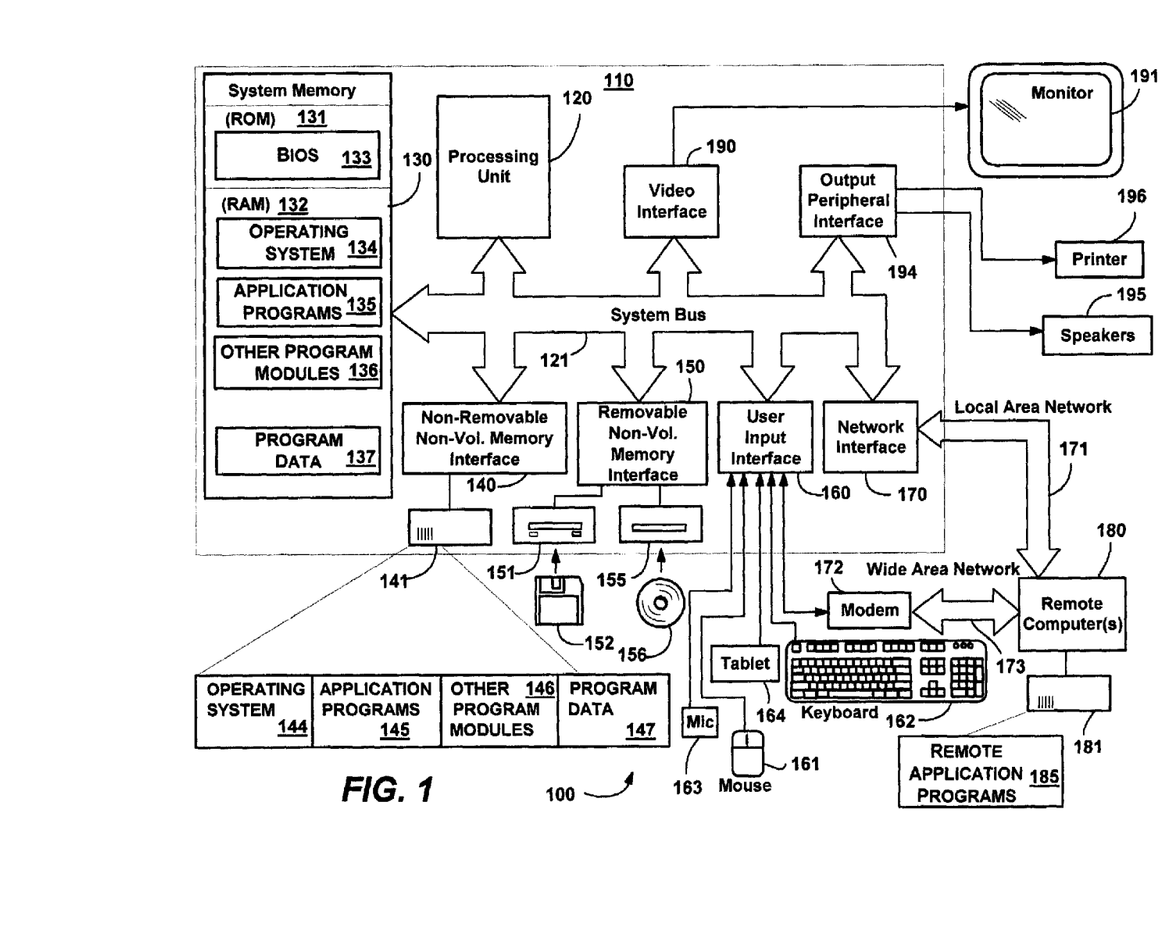
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Managed Query Pre-Optimization

The present invention is, in part, directed to removing some of the workload from the database management system. To this end, there is provided a method and system for intelligently simplifying database queries into pre-compiled procedures, executing the pre-compiled procedures to obtain keys, and then using those keys to reconstruct the query results. In an example implementation described herein, the present invention will primarily be described with reference to a UDDI-based environment, such as to handle UDDI "find" requests seeking information on a web service, however it will be readily apparent that the present invention may be applied to databases and query handling in general. Further, although the present invention may be used to query for distributed network services, in which a client running on essentially any platform may use a defined protocol such as SOAP (Simple Object Access Protocol) to access network services over UDDI, and the examples are described with respect to SOAP, XML, UDDI, and/or Windows®/.NET the present invention is not limited to such an environment, but applies to any technology that handles requests related to information maintained in a data store. Thus, although the examples herein are based on the UDDI standards, it is understood that the actual invention may be abstracted to provide generic capabilities for database querying on alternative systems.

Also, it should be noted that as used herein, terms such as "optimization," "most efficient" "maximizing" and so on are not intended to be absolute qualifiers, but rather are goals which the present invention attempts to approach, statistically or otherwise. Thus, for example, a query may be referred to herein as being "pre-optimized" into a series of stored procedures for efficient execution in accordance with the present invention, however it is possible that a more optimal ordering of stored procedures may be developed and/or sent to the database for a given set of circumstances. For example, choosing a key that is most selective first will provide the least hits and thus the best results, however for any given query there may be an exception where a different key would actually have produced fewer hits had that key been first used, even though that different key normally results in statistically more hits than the one that was used. Nevertheless, despite such exceptions, as will be understood, the present invention has substantially improved query handling by removing much of the database workload, while retaining the flexibility that users need.

Figure 2:
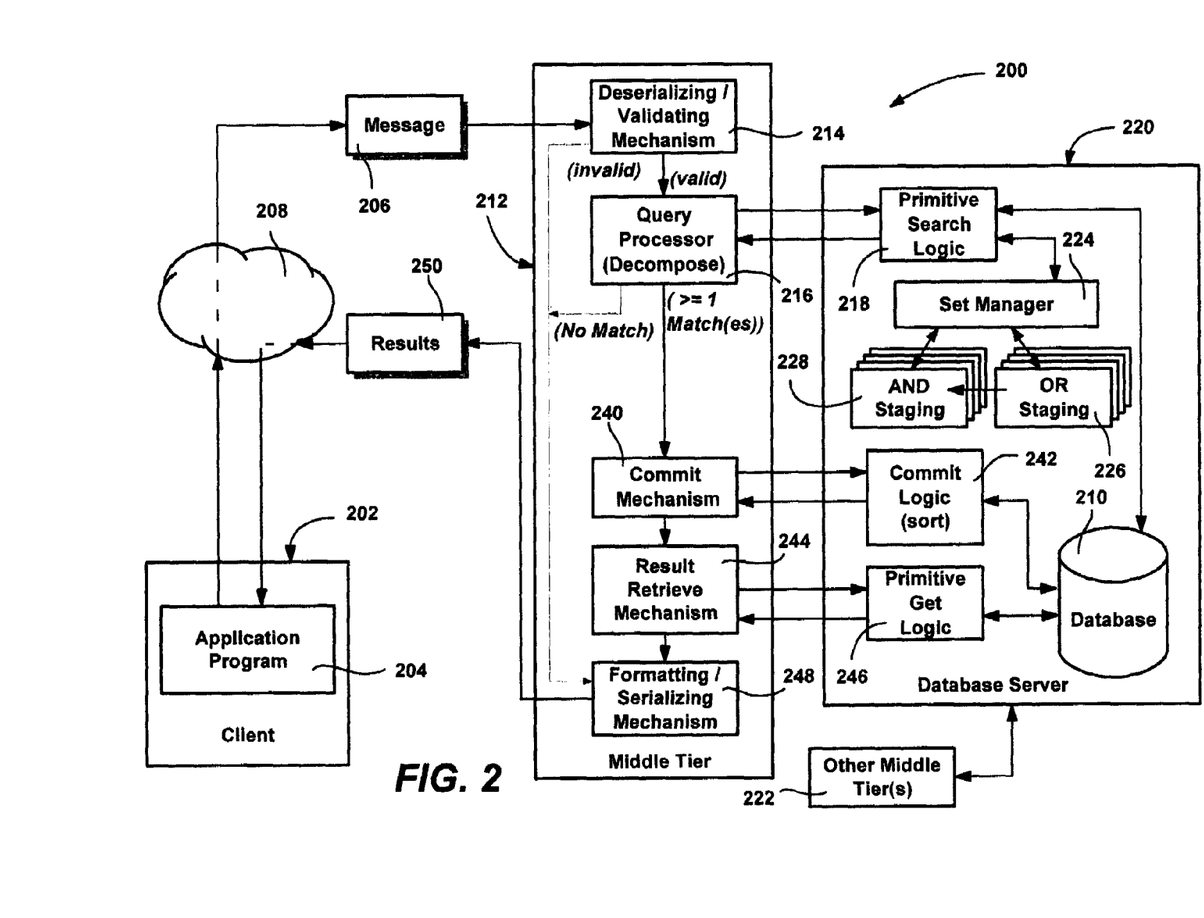
FIG. 2 is a block diagram generally representing an example architecture in which a client query is received, decomposed, managed and pre-optimized into queries from which results are constructed and returned, in accordance with an aspect of the present invention.

Turning to FIG. 2 of the drawings, there is shown an example architecture 200 in which a client 202 having an application program 204 or the like executing thereon sends a message 206 (e.g., via the internet 208, an intranet, or in some other manner) seeking information that is maintained in a database 210. For example, in a UDDI environment, the message 206 may be in an XML format, seeking a business via a "find" query, as shown in the example below:

```
<find_business>
    <find_Qualifiers>
        <find_Qualifier>sortByNameDesc</find_Qualifier>
    </find_Qualifiers>
    <name>Mic% </name>
    <categoryBag>
        <keyedReference tModelKey="uuid:q345.." keyValue="Asia"/>
    </categoryBag>
</find_business>
```

Note that search arguments in a UDDI-based message may include one or more of name, URL, categorization and identifier constraints. Matching criteria may be specified, such as uppercase/lowercase/case-insensitive, as may a sort order, such as sort by name. As specified in UDDI, if multiple search arguments are present, the results for each argument are essentially AND-ed together, e.g., if a name search argument and a category search argument are specified, the result must meet both the name and category constraint. Note that within certain search arguments, OR-ing is acceptable in UDDI, e.g., find category A or category B, and wildcards may be used where appropriate, e.g., name A% or BCD_.

In keeping with the present invention, the query is received at a middle tier 212, where it is managed and pre-optimized as described below. Although not necessary to the present invention, after deserializing the message for processing, a validating mechanism evaluates the message to determine whether it is valid for the appropriate environment. In the present example, the message would be evaluated to determine if it complied with UDDI-specified requirements for a "find" message. If not, an appropriate error message would be returned, otherwise processing would continue. These deserializing and validating mechanisms are represented in the block diagram of FIG. 2 by the block labeled 214.

In accordance with an aspect of the present invention, as a first part of query management and pre-optimization, valid messages are decomposed by a query processor 216 into primitives from which keys are returned. In general, the query processor 216 takes the search arguments, also referred to as constraints, and works with primitive search logic 218 in a database server 220 to act as a search analyzer, including ordering queries for efficiently retrieving search key results, and also to immediately terminate queries when no search keys are possible.

By way of example, consider this simple example query (presented in a sentence-like form for readability) seeking results for the following search arguments:

Return results where Identifier = ("234" OR "345") AND Name = ("A*" OR "B*").

In accordance with an aspect of the present invention, this query is mapped to a set of less complex searches, comprising pre-compiled procedures, or primitives that are then used to search the database for matches. The primitives are database specific, but in general comprise already compiled and stored procedures optimized for the particular database. For efficiency, the present invention attempts to order the primitives in a most-selective first fashion, that is, the query is analyzed based on selectivity. In the above example, it is likely that an identifier, which is fairly specific, will return fewer results than a wildcard name search. Thus, the query processor 216 would provide the primitives seeking keys for the identifiers to the primitive search logic 218 first. Because the results are to be AND-ed, any time that there is not at least one matching identifier, there is no need to query for the names, thereby saving significant database work.

Although not specifically represented in FIG. 2, it should be noted that many messages may be being received at the middle tier 212 at any one time, and also possibly at other middle tiers 222. To track the results, e.g., the keys that are returned when searching with the various primitives, each query is assigned a unique context identifier. A set manager 224 (of which there may be multiple instances, not shown), uses the context identifier to distinguish which keys are associated with which queries.

More particularly, for each primitive, the set manager 224 puts the returned key or keys (following any filtering such as case-sensitive filtering) into a per-context ID "OR" staging area 226 until no more values need to be processed for that particular search argument. This union of keys is then AND-ed (intersected) with any previously returned keys in a per-context ID "AND" staging area 228. When finished with any search argument, the set manager 224/primitive search logic 218 returns the number of keys found to the query processor 216. Before continuing with the next primitive, a test is performed to determine whether no key was found. If so, the process completes, because nothing will match the query regardless of how many keys for other search arguments would be AND-ed. Note that this is appropriate in a UDDI-based environment in which different search arguments can only be AND-ed; in an environment that allowed OR-ing of different search arguments, the general process would still work for each separate OR-ed search argument, but rather than aborting and returning a no matches found message, the results of each separate OR-ed search argument would need to be processed.

In the above example, if a key was returned for identifier "234" the OR staging area 226 would be used to hold that key until the query primitive for "345" was submitted, and corresponding key or keys corresponding to "345", if any, OR-ed with any keys in the OR staging area 226. When all OR-ed values are complete for this search argument, if at least one match was found, the union would be placed (because this was the first search argument) in the AND staging area 228. Then, upon processing the "name" search argument by appropriately submitting primitives, (OR-ing as necessary in the OR staging area 226), the set of keys in the AND staging area 228 can only stay the same or contract. Note that the logic is performed external to the database, (although any keys already known can be used to limit further primitive searches), as appropriate. Again, if at any time the number of matching keys returned is zero, the process aborts in an AND-only search argument environment such as specified in UDDI.

There is one thus stage for each search argument specified in the original inquiry. As each stage is executed, a list of matching keys is maintained in the database server. This list of keys contracts as each stage of the query is executed, (after possibly expanding within a search argument via OR handling), as possibly modified via query options (e.g., filtering) exposed in the inquiry interface. When the primitives have been processed and at least one key matched, the search is committed by commit mechanism 240 in the middle tier 212 along with commit logic 242 in the database server 220. To this end, when the stages have been executed and the inquiry option is complete, the list of matching keys is sorted (if specified) according to query options exposed in the inquiry interface, and is returned to the middle tier 212.

Once sorted, a result retrieval mechanism 244 in the middle tier 212 in conjunction with primitive get logic 246 retrieves the full details for each entity represented in the key list. The middle tier 212, via a formatting/serializing mechanism 248, returns the results 250 to the client.

In this manner, the client received the results in an appropriate format, e.g., an XML-based message for UDDI requests. The application is able to submit fairly complex queries that need comply with only a few rules, e.g., as specified by UDDI, thereby providing significant flexibility that meets users' demands, yet are decomposed into a set of simplified queries that are then used to obtain the information without overly burdening the database with complex queries. The managed query pre-optimization processing provides a high level of performance, is highly secure because only pre-compiled stored procedures (rather than ad-hoc queries) are applied to the database, and is highly manageable. Moreover, the present invention is highly extensible, as in general only the set of primitives need to change to match changing requirements.

Note that in the UDDI implementation, which is only one example of how the present invention may provide benefits to request handling in general, the managed middle-tier components have been implemented using the Microsoft®.NET Framework and C# programming, although it is feasible to implement equivalent capabilities using another middle-tier development platform. This technology has been implemented as part of the optional UDDI Services component available with Windows .NET Server 2003. The database components, described below, were implemented using Microsoft SQL Server 2000 Transact-SQL stored procedures and relational database schema, however it can be readily appreciated that any enterprise-class relational database management system with equivalent capabilities may be used.

Figure 3:
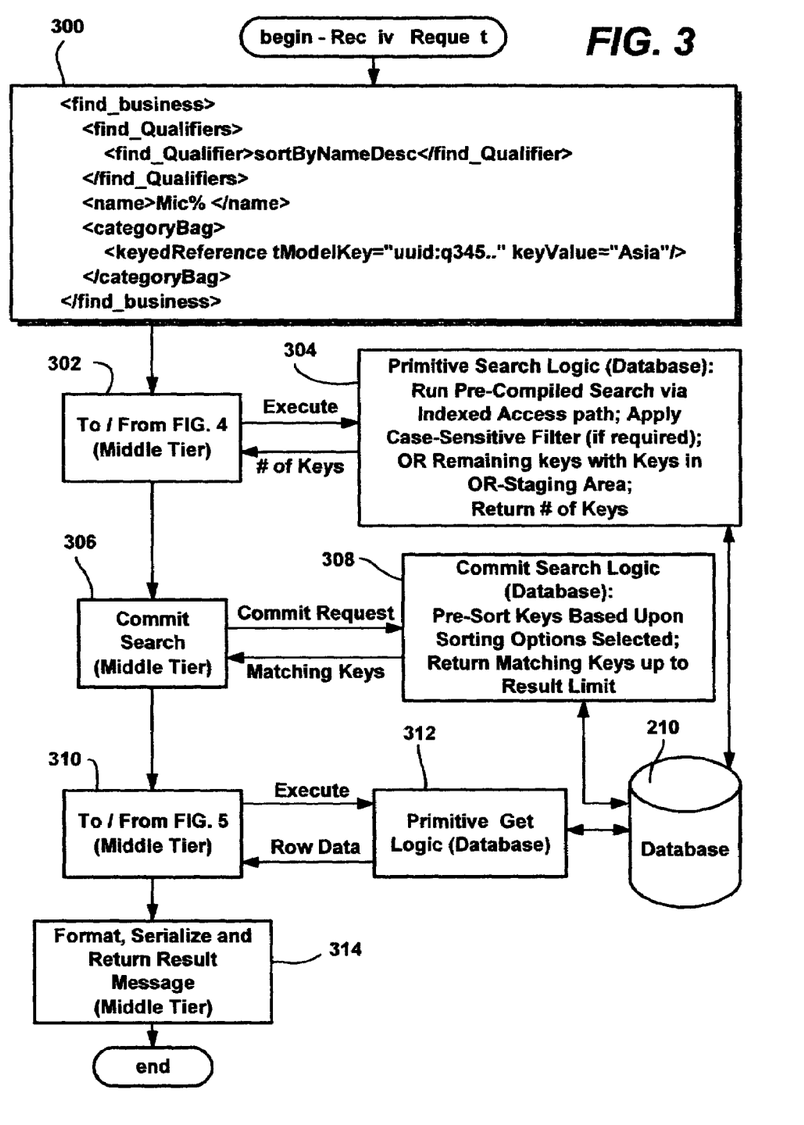
FIGS. 3–5 comprise a flow diagram representing various operations when processing an example UDDI-based query, in accordance with an aspect of the present invention.
Figure 4:
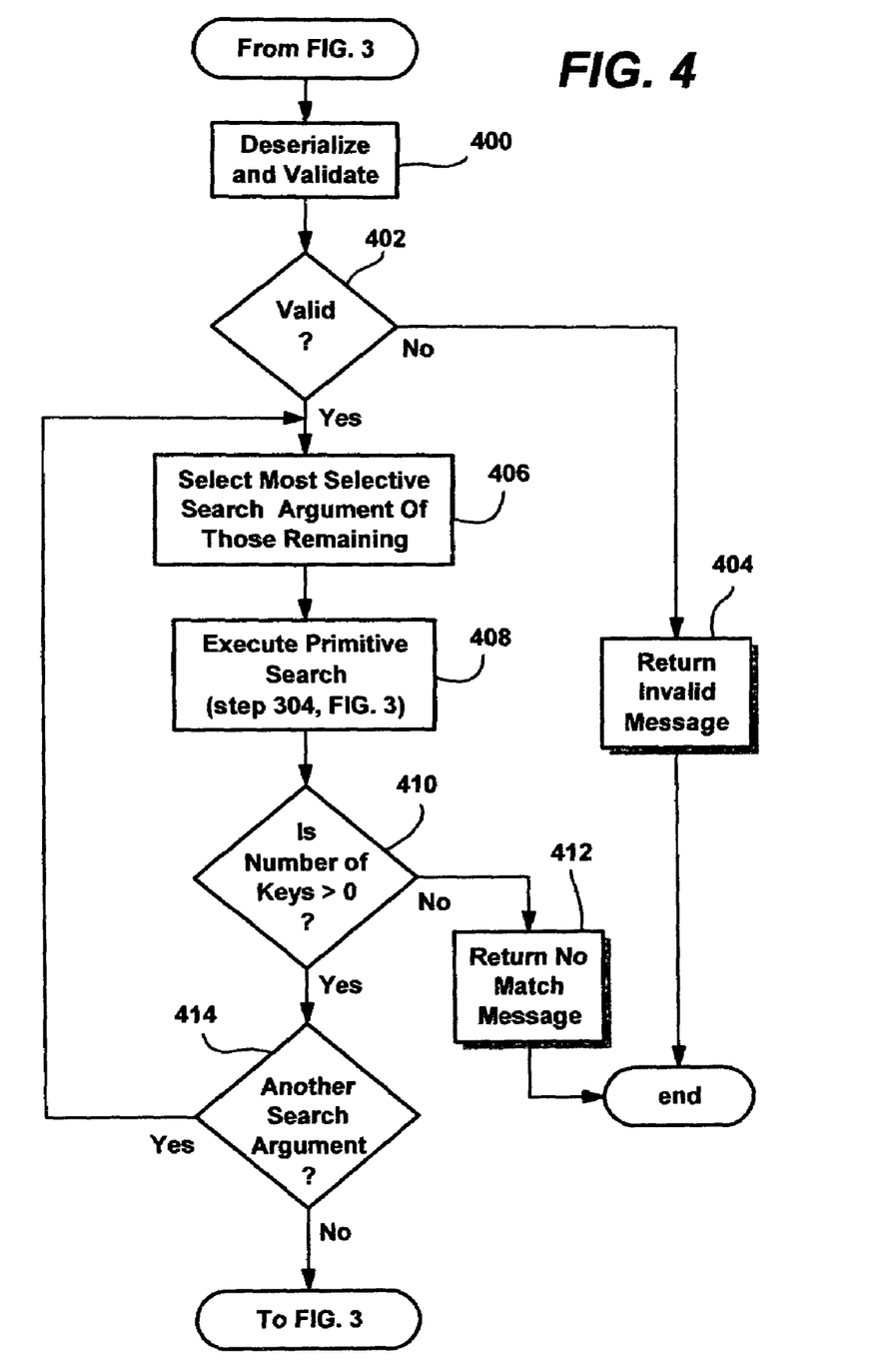
Figure 5:
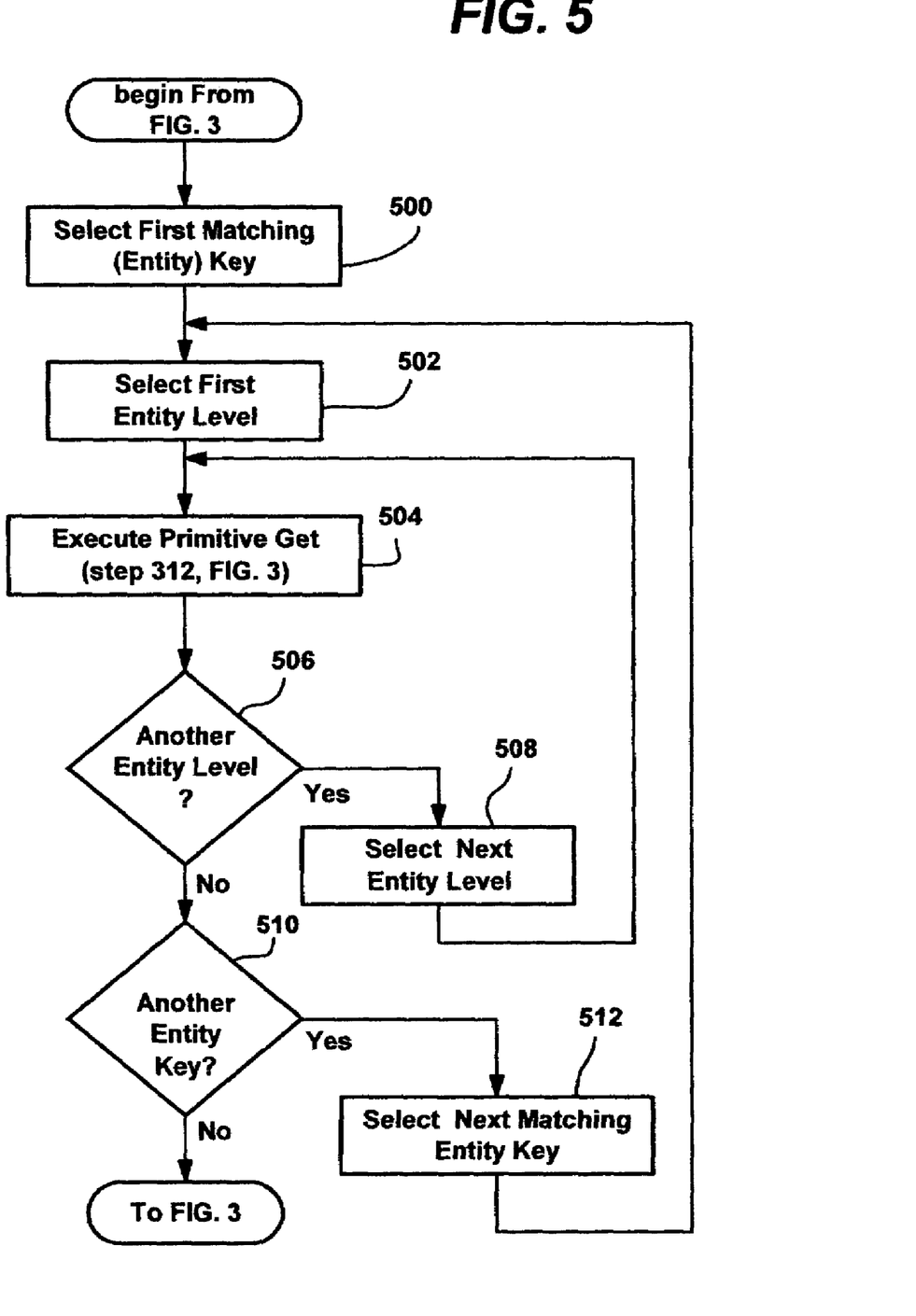

Turning to an explanation of the present invention with particular reference to the flow diagrams of FIGS. 3–5, the process starts when a request is received at the middle tier, generally represented by the example XML find request 300 in FIG. 3. In FIG. 3, the interaction between the middle tier components and the database server components is generally shown beneath this example message with the operations of the middle tier components on the left and the operations of the database components on the right. Thus, as represented in FIG. 3 by step 302, the middle tier processes the message, (e.g., at the deserializing/validating mechanism 214 and the query processor 216).

The processing of the message is represented in FIG. 4, where deserializing and validation is performed via steps 400 and 402. If invalid, an appropriate error message is returned at step 404. If valid, the process continues to step 406, where, for each search argument, taking the argument believed to be the most selective, the above-described primitive search is executed. This search corresponds to step 304 of FIG. 3, in which a pre-compiled search is run, case-sensitive filtering is applied (as required), keys are OR-ed as appropriate until the possible values in the search argument have each been searched, and the number of matching keys returned to the middle tier. Note that the middle tier may have a pool of connections to the database, and uses a connection for the communication in a known manner.

Returning to FIG. 4, if there is not at least one key, step 410 branches to step 412 to return a message indicative of no matches found. As described above, in an environment in which search arguments are AND-ed, step 410 saves significant load on the database because any received message which has no matches for a search argument has a "no matches" message returned at step 412, frequently without having applied all of the search arguments to the database due to the most selective search argument generally being processed first.

If the number of keys is not zero at step 410, step 414 is executed which repeats the search process with the next most selective search argument via steps 406 and 408, until either a search argument has no matches or no search arguments remain to be processed at step 414.

Returning to FIG. 3, step 306 is executed when each search argument returned at least one key. Step 306 represents the middle tier instructing the database components to commit the search, in which event the database commit component pre-sorts the keys based upon any sorting options that were selected, and returns the matching keys, up to some result limit. Step 310 then applies these keys to execute the retrieval of the rows of data via step 312.

To this end, as represented in FIG. 5, to handle multiple entity levels that may be within the keys, each level of each key is processed, essentially within a nested loop. Thus step 500 represents selecting a matching key, and step 502 a level of that key, and step 504 represents retrieving the row data. Steps 506 and 508 repeat the retrieval until each level of that key has been processed, and steps 510 and 512 repeat until each key is processed. When complete, the process continues to step 314 of FIG. 3, which represents formatting (e.g., in XML), serializing for transmission and returning the message to the client.

It should be noted that not only may the present invention may adapt to changes in the type of requests that may be handled, e.g., as new search arguments or associations are specified, but that the present invention may adapt and/or be customized to meet a particular clients needs. Thus, for example, statistics may be kept by the client and/or the middle tier to determine whether the most selective primitives are being chosen first. For example, a given client may often query with search arguments A, B, C, D that have no hits on what is ordinarily the third-most selective argument (C), while specifying first and second search arguments A and B that almost always have hits, and this can be measured. For such a client, the argument (C) can be searched first to improve efficiency. Note that the client may request the revised search ordering, or the middle tier may track this itself, such as by noting that a certain combination of search arguments provides an exception to the general rules.

As can be seen from the foregoing detailed description, there is provided a method and system by which pre-compiled, pre-optimized stored procedure primitives are executed in stages via pre-defined access paths to indexed data, thereby tending to maximize index selectivity and thereby improving performance. The stages can be ordered such that the most selective search arguments are executed first, and also to stop executing in the event that the key count hits zero (avoiding wasted cycles for queries that would not return results if further processed), thereby improving overall query performance. The method and system further eliminate the need to generate syntactically correct complex SQL queries or the like, instead using simple stored procedure primitives that greatly reduce code complexity while retaining a great deal of flexibility in a manageable and secure manner.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
   receiving a query comprising a plurality of search arguments;
   mapping the query to a plurality of pre-compiled procedures that correspond to the plurality of search arguments;
   executing a plurality of primitive searches of a database using the pre-compiled procedures;
   obtaining a list of keys from the execution of the plurality of primitive searches; and
   executing at least one database operation using data in the list of keys to retrieve results.

2. The method of claim 1 further comprising returning the results in response to the query.

3. The method of claim 1 further comprising validating the query.

4. The method of claim 1 further comprising, for each primitive search that is executed, receiving a value indicative of a number of keys, and determining whether the number of keys indicates that no match was found for a given search argument.

5. The method of claim 1 further comprising filtering results of the plurality of primitive searches based on information received with the query such that the key list contains a filtered subset of returned keys.

6. The method of claim 1 further comprising committing the primitive searches.

7. The method of claim 6 wherein committing the primitive searches includes sorting the key list based on information received with the query.

8. The method of claim 1 wherein executing a plurality of primitive searches of a database using the pre-compiled procedures comprises, maintaining a staging area including a key set of at least one key returned from a primitive search, and combining the key set with another key returned from another primitive search.

9. The method of claim 8 wherein the other primitive search corresponds to a different search argument, and wherein combining the key set comprises performing an AND-ing of keys.

10. The method of claim 8 wherein the other primitive search corresponds to a common search argument, and wherein combining the key set comprises performing an OR-ing of keys.

11. The method of claim 1 further comprising, determining which of the search arguments is likely to be most selective with respect to receiving keys, and further comprising ordering the search argument data such that the search argument that was determined as most likely selective is used first in executing the primitive searches of the database.

12. The method of claim 1 further comprising associating a context identifier with the query.

13. The method of claim 2 wherein the query is received in an XML message, and wherein returning the results comprises formatting an XML response message.

14. The method of claim 1 wherein the query is received in an UDDI find request.

15. A computer-readable medium having computer-executable instructions for performing the method of claim 1.

16. In a computing environment, a method comprising:
   a) receiving a client query comprising a plurality of search arguments;
   b) decomposing the query into component parts corresponding to the search arguments;
   c) ordering the component parts and selecting a first component part as a selected component part based on the ordering;
   d) executing a primitive search of a database for the selected component part based on a pre-compiled procedure that maps to the selected component part;
   e) combining the result of the search with any previous search results in a combined result key list;
   f) determining whether the combined result key list includes at least one key,
      1) and if not, terminating the process and returning a response indicative of no match found;
      2) and if so, determining whether a next component part remains to be searched, and if so, selecting that next component part as the selected component part and returning to d), and if not, continuing to g)
   g) using data of the key list to retrieve results from the database; and
   h) returning a response including the results to the client query.

17. The method of claim 16 wherein the result of at least one search for a selected component part comprises the results of a plurality of searches OR-ed together.

18. The method of claim 16 wherein combining the result of the search comprises AND-ing the result with any previous search results in a combined result key list.

19. The method of claim 16 further comprising validating the client query.

20. The method of claim 16 further comprising filtering the result of at least one search.

21. The method of claim 16 further comprising sorting the data of the key list.

22. A computer-readable medium having computer-executable instructions for performing the method of claim 16.

23. In a computing environment, a system comprising:
   means for receiving a request comprising a plurality of search arguments;
   means for mapping the request to a plurality of pre-compiled procedures that correspond to the plurality of search arguments;
   means for searching a database using the plurality of pre-compiled procedures;
   means for combining keys received from the database search into a key list; and
   means for retrieving results from the database via data in the key list.

24. The system of claim 23 wherein the means for receiving a request comprises request handling means in a UDDI environment.

25. The system of claim 23 further comprising means for returning the results in response to the request.

* * * * *